UNITED STATES PATENT OFFICE.

FRIEDRICH BOEDECKER, OF BERLIN-DAHLEM, GERMANY, ASSIGNOR TO THE FIRM
I. D. RIEDEL A. G., OF BERLIN-BRITZ, GERMANY.

BARBITURIC ACID AND PROCESS OF MAKING SAME.

No Drawing. Application filed September 23, 1924, Serial No. 739,426, and in Germany October 10, 1923.

I have now found that barbituric acid compounds having a substituted methylene group in which at least one of the hydrogen atoms of the methylene group is substituted by a halogenallyl group containing a halogen at least in the $\beta$-position, possess quite extraordinary hypnotic power and are more effective than the barbituric acids hitherto employed for this purpose. The second hydrogen atom of the methylene, can also be substituted by a halogenallyl e. g. $\beta$- or $\gamma$-bromallyl radical or by any other alkyl, (for instance isopropyl or diethylmethyl group) aryl, or alicyclic radical.

The production of the new compound can be carried out by preparing a malonic acid ester of the general formula

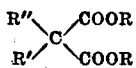

in which R'' is a halogenallyl especially $\beta$-bromallyl, or $\beta$-$\gamma$-dibromallyl, R' a hydrogen atom, a halogenallyl e. g. $\beta$- or $\gamma$-bromallyl or any aliphatic, aromatic or alicyclic radical, for example by acting on the sodium compounds of malonic acids, their chlorides, esters or derivatives, for example the cyanacetic ester or its already mono substituted derivatives, with 1.2-dibrom-2.3-propylene, and these compounds are then transformed into the corresponding barbituric acids in the usual manner. It will be understood that the "usual manner" here referred to, may consist in causing a malonic acid compound to react with urea or a derivative thereof, analogously to the formation of the barbituric acid

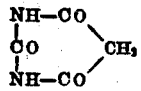

The same result can be achieved by introducing a radical R'' into unsubstituted or monosubstituted barbituric acids or their derivatives, which are produced from unsubstituted malonic acids or mono substituted malonic acids having one of the before mentioned radicals R' or R'', or by direct substitution of barbituric acid or derivatives. Instead of starting with urea one may also use substituted ureas, guanidine, thiourea, etc., as starting materials.

I have also found that it is not necessary to first produce or prepare 1.2-dihalogen-2.3-propylene in a pure state in order to introduce the $\beta$-halogenallyl radical, but on the contrary it is possible to carry out the substitution of the halogenallyl radical by starting directly with 1.2.3-trihalogenpropane (e. g.), tribrompropane, $$(CH_2Br—CHBr—CH_2Br)$$

and permitting this to act on barbituric acids in the presence of alkali. The splitting off of hydrohalogenic acid occurs so easily that the reaction can even be carried out at ordinary temperature. The splitting off of hydrohalogenic acid also can naturally be carried out first and then the condensation brought about. In both cases one can obtain the $\beta$-halogenallyl acids directly from 1.2.3-trihalogenpropane which facilitates the production of the valuable products characterized by their extraordinary hypnotic powers. By application of trihalogenpropylene I obtain the corresponding $\beta$-$\gamma$-halogenallyl compounds.

Example 1.

170 parts of isopropylbarbituric acid are gradually added (e. g. at room temperature) to a sodium ethylate solution prepared from 23 parts of sodium and warming (say at 80–85° C.) with brisk agitation, and finally 240 parts of 1.2-dibrom-2.3-propylene are permitted to flow in slowly. After heating for several hours at 90–100° the reaction is completed. After blowing off the alcohol the $\beta$-bromallyl-isopropylbarbituric acid is recovered in almost quantitative yield in the form of colorless crystals.

After recrystallization from dilute acetic acid the acid shows a melting point of 181°.

Formula of reaction:

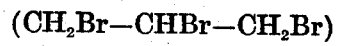

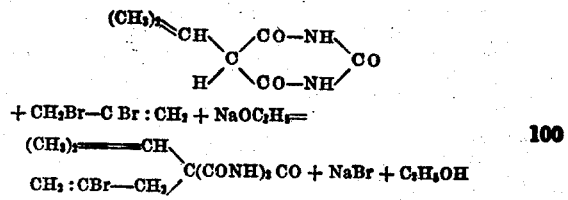

Example 2.

250 parts of dibrompropylene are added to a clear solution of 170 parts of isopropylbarbituric acid in dilute caustic soda solution containing 40 parts of sodium hydroxide, in the cold, and the mixture is briskly shaken. After a short time colorless crystals begin to separate out and the separation continues steadily with further shaking but only gradually. The precipitated β-bromallyl-isopropylbarbituric acid is filtered by suction and recrystallized from water or dilute acetic acid.

Any untransformed isopropylbarbituric acid is recovered from the filtrate after separating out the unchanged dibrompropylene, by precipitation with concentrated hydrochloric acid.

Formula of reaction:

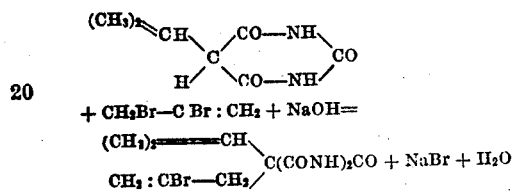

Example 3.

128 parts by weight of barbituric acid is dissolved in 2000 parts (by volume) caustic soda solution containing 80 parts by weight of caustic soda, and, while warming, several hours stirred well with 440 parts by weight of dibrompropylene. After the dibrompropylene has disappeared the reaction is regarded as finished. Upon cooling, the product of reaction is separated out and filtered by suction. After recrystallization from alcohol in the presence of animal charcoal the di-β-brom allyl barbituric acid is recovered in the form of colorless crystals, showing a melting point of 232°-233°. It is soluble in alcohol, acetone and alkalies, little soluble in ether, benzol, water.

Formula of reaction:

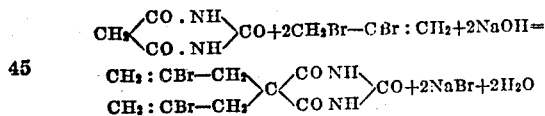

Example 4.

170 parts by weight of isopropylbarbituric acid is dissolved in a solution of 80 parts by weight of caustic soda (100%) in 600 parts of water, 280 parts by weight of tribrompropane added and the whole dissolved to a homogeneous mixture by the addition of 2000 parts by volume of ordinary alcohol. The reaction mixture is heated for several hours on the steam bath and the alcohol then removed with steam. Toward the end of the distillation isopropyl-bromallyl-barbituric acid separates in the form of crystals in the flask. The yield is 195 parts.

By recrystallization from dilute alcohol the acid is recovered in a pure state having a melting point of 181°.

Formula of reaction:

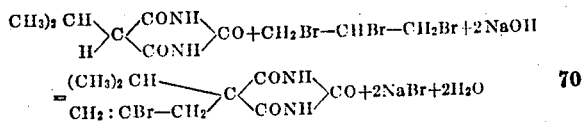

Example 5.

280 parts by weight of tribrompropane are heated for an hour at 80° C. under a reflux condenser with 40 parts by weight of caustic soda in small pieces the size of peas. After cooling, a solution of 354 parts by weight of phenylbarbituric acid in caustic soda solution of 7% containing 40 parts by weight sodium hydroxide is added and mixed with 1800 parts by volume of alcohol until the mixture becomes homogeneous. After warming for several hours at the temperature of a water bath the reaction is complete. The alcohol is distilled off under diminished pressure and phenyl-bromallyl-barbituric acid separates out in the flask. Yield 225 parts.

After recrystallization from dilute acetic acid the acid shows a melting point of 188-189°. It is easily soluble in alcohol, glacial acetic acid, alkalies and soda solution.

The splitting off of hydrobromic acid from tribromhydrine can naturally also be carried out by means of alcoholic alkali.

Formula of reaction:

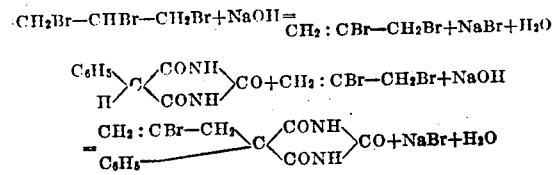

Example 6.

170 parts by weight isopropylbarbituric acid is dissolved in 500 parts (by volume) double normal caustic soda solution. After adding 125 parts (by weight) dichlorpropylene the mixture is heated several hours under a reflux condenser. The precipitated product of reaction is filtered off by suction and recrystallized from dilute alcohol. The β-chlorallylisopropylbarbituric acid thus obtained appears in the form of long colorless needles, melting at 171°. The acid is soluble in alcohol, ether, acetone, little soluble in chloroform, tetra hydrogenated naphthalene and water. From sodium carbonate solution or caustic soda solutions the acid is separated unchanged by addition of acids. The same acid is obtained by reaction in the same manner of 2-chlor-3-brompropylene-1 with the sodium salt of the isopropylbarbituric acid (formula of reaction analogous to Example 4).

Example 7.

170 parts by weight of isopropylbarbituric acid are dissolved in caustic soda solution of 7% containing 40 parts by weight caustic soda. After adding a small quantity potassium iodide and 290 parts by weight of 1.2.3-tribrompropylene the mixture is heated while vigorously stirring. After some working the separated crystalline product is filtered off by suction and, when necessary, washed with gasoline. By recrystallization from methyl alcohol the β-γ-dibromallylisopropylbarbituric acid is obtained in pure state with melting point of 182–183° and soluble in ethylalcohol, chloroform, ether, benzol, caustic soda solution, sodium carbonate solution, little soluble in gasoline, cyclohexane, methylcyclohexane, water.

Formula of reaction:

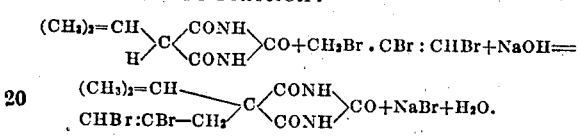

I claim:

1. As new products, the herein described substituted barbituric acids in which at least one of the hydrogen atoms of the methylene group is substituted by a halogenallyl group containing halogen at least in the β-position.

2. As new products the herein described barbituric acid in which at least one of the hydrogen atoms of the methylene group is replaced by β-halogenallyl.

3. As new products, the herein described substituted barbituric acids in which at least one of the hydrogen atoms of the methylene group is replaced by β-bromallyl.

4. As new products, the herein described substituted barbituric acids in which at least one of the hydrogen atoms of the methylene group is replaced by dihalogenallyl.

5. As new products, the herein described substituted barbituric acids in which at least one of the hydrogen atoms of the methylene group is replaced by a halogenated allyl group.

6. Process of preparing hypnotic derivatives of barbituric acids, which comprises substituting at least one of the hydrogen atoms of the methylene group of the barbituric acids by halogenallyl, containing halogen at least in the β-position.

7. A method of forming substituted barbituric acids, which comprises treating barbituric acid, in which at least one of the hydrogen atoms of the methylene group is free, with halogen propylene in presence of alkali.

8. A method of forming substituted barbituric acids, which comprises treating barbituric acid, in which at least one of the hydrogen atoms of the methylene group is free, with 1.2.3-trihalogenpropane in presence of alkali.

In testimony whereof I affix my signature.

Dr. FRIEDRICH BOEDECKER.